(12) United States Patent
Connor et al.

(10) Patent No.: US 10,157,487 B2
(45) Date of Patent: Dec. 18, 2018

(54) VR BIOMETRIC INTEGRATION

(71) Applicant: International Business Machines Corporation, Armonk, NY (US)

(72) Inventors: Samuel R. Connor, Apex, NC (US); Jonathan W. Jackson, Durham, NC (US); Robert H. Sharrar, Garner, NC (US)

(73) Assignee: International Business Machines Corporation, Armonk, NY (US)

( * ) Notice: Subject to any disclaimer, the term of this patent is extended or adjusted under 35 U.S.C. 154(b) by 463 days.

(21) Appl. No.: 14/813,871

(22) Filed: Jul. 30, 2015

(65) Prior Publication Data

US 2017/0031439 A1  Feb. 2, 2017

(51) Int. Cl.
| G06F 3/048 | (2013.01) |
| G06T 13/40 | (2011.01) |
| G06T 19/00 | (2011.01) |
| G06F 3/01 | (2006.01) |
| G06F 3/0481 | (2013.01) |

(52) U.S. Cl.
CPC .............. *G06T 13/40* (2013.01); *G06F 3/011* (2013.01); *G06F 3/0481* (2013.01); *G06T 19/006* (2013.01)

(58) Field of Classification Search
CPC ... G06F 21/6218; G06F 3/04847; G06F 21/32
See application file for complete search history.

(56) References Cited

U.S. PATENT DOCUMENTS

| 2007/0211047 A1* | 9/2007 | Doan ........................ A63F 1/04 345/419 |
| 2009/0131165 A1 | 5/2009 | Buchner et al. |
| 2009/0319609 A1* | 12/2009 | Ferraro ................... G06F 3/011 709/204 |
| 2010/0050100 A1* | 2/2010 | Dettinger ................ G06F 3/011 715/764 |
| 2010/0156906 A1* | 6/2010 | Montgomery ........ G06T 15/205 345/427 |
| 2010/0185640 A1* | 7/2010 | Dettinger ............... G06Q 10/10 707/758 |
| 2010/0278393 A1* | 11/2010 | Snook ..................... G06F 3/011 382/107 |

(Continued)

FOREIGN PATENT DOCUMENTS

| EP | 2597582 A2 | 5/2013 |
| WO | 2004104763 A2 | 12/2004 |
| WO | 2014127078 A1 | 8/2014 |

OTHER PUBLICATIONS

Ellen et al.; Exergames for Elderly; 2011, IEEE; 4 pages.*

(Continued)

*Primary Examiner* — Linh K Pham
(74) *Attorney, Agent, or Firm* — Patterson + Sheridan, LLP

(57) ABSTRACT

Method, system, and computer-readable program product for modifying at least one virtual activity capability of an avatar in a virtual reality setting based on a real-world physical activity metric of a user of the virtual reality setting. The user's physical activity metrics are tracked via a fitness tracker or other biometric sensor. As the user's physical activity metric(s) improve, the virtual activity capabilities of the user's avatar in the virtual reality setting also improve.

20 Claims, 6 Drawing Sheets

(56) References Cited

U.S. PATENT DOCUMENTS

| | | | |
|---|---|---|---|
| 2011/0098928 A1* | 4/2011 | Hoffman | A63B 24/0062 |
| | | | 702/5 |
| 2011/0304632 A1* | 12/2011 | Evertt | G06F 3/011 |
| | | | 345/474 |
| 2013/0132837 A1* | 5/2013 | Mead | G06Q 10/10 |
| | | | 715/716 |
| 2014/0200416 A1 | 7/2014 | Kashef et al. | |
| 2014/0235345 A1 | 8/2014 | Kelly et al. | |
| 2014/0243093 A1 | 8/2014 | Rom et al. | |
| 2014/0309028 A1 | 10/2014 | Lyons et al. | |

OTHER PUBLICATIONS

Nacke, Lennart et al., Game Metric and Biometrics: The Future of Player Experience Research, Canadian Game Developers Conference, May 2009, ACM, New York, United States.

Mirza-Babaei, Pejman et al., How Does It Play Better? Exploring User Testing and Biometric Storyboards in Games User Research, CHI 2013: Changing Perspectives, pp. 1499-1508, ACM, New York, United States.

* cited by examiner

| REAL-WORLD RUNNING DISTANCE | REAL-WORLD ACTIVITY LEVEL | AVATAR RUNNING DURATION ATTRIBUTE |
|---|---|---|
| LESS THAN ONE MILE | ACTIVITY LEVEL ONE | RUN FOR 20 SEC. |
| BETWEEN ONE MILE AND THREE MILES | ACTIVITY LEVEL TWO | RUN FOR 30 SEC. |
| MORE THAN THREE MILES | ACTIVITY LEVEL THREE | RUN FOR 45 SEC. |

| NUMBER OF REAL-WORLD GOLF SWINGS | REAL-WORLD ACTIVITY SKILL LEVEL | AVATAR GOLF SHOT ACCURACY ATTRIBUTE |
|---|---|---|
| < 100 / WEEK | SKILL LEVEL ONE | 60% ACCURACY |
| 100 - 300 / WEEK | SKILL LEVEL TWO | 85% ACCURACY |
| > 300 / WEEK | SKILL LEVEL THREE | 98% ACCURACY |

FIG. 6A

| REAL-WORLD GOLF HANDICAP | REAL-WORLD ACTIVITY SKILL LEVEL | AVATAR GOLF SHOT ACCURACY ATTRIBUTE |
|---|---|---|
| > 20 | SKILL LEVEL ONE | 70% ACCURACY |
| 10 - 20 | SKILL LEVEL TWO | 90% ACCURACY |
| < 10 | SKILL LEVEL THREE | 97% ACCURACY |

FIG. 6B

| NUMBER OF HOURS OF REAL-WORLD DRIVING PER WEEK | REAL-WORLD ACTIVITY SKILL LEVEL | AVATAR DRIVING ENDURANCE ATTRIBUTE |
|---|---|---|
| < 10 HOURS | SKILL LEVEL ONE | 30 MINUTES |
| 10 - 30 HOURS | SKILL LEVEL TWO | 60 MINUTES |
| > 30 HOURS | SKILL LEVEL THREE | 90 MINUTES |

FIG. 7

VR BIOMETRIC INTEGRATION

BACKGROUND

The present invention relates to avatars in virtual reality environments, and more specifically, to attributes of the avatars being based on real-world physical attributes of a user of a virtual reality setting.

In a virtual reality setting, a virtual-reality user controls an avatar within the virtual reality setting. The avatar is a human being character or other type of character (e.g., troll, ogre, etc.) that interacts within the virtual reality setting. For example, videogame players control avatars in first-person shooter games, racing games, role-playing games, and the like. As another example, flight simulators or driving simulators may simulate physiological effects on an avatar operating the aircraft or vehicle. For example, pilots eventually lose consciousness when they experience too much maneuvering acceleration (i.e., G forces), and a simulator may simulate this loss of consciousness by dimming or blacking out a visual display of the flight simulator environment if the flight simulator user provides control inputs that would result in such G forces above a predetermined level.

In the above described examples, limitations of the avatars are not tied to the physical activity level and/or skill level of the user of the virtual-reality setting. As a result, in the instances in which the virtual-reality setting is a simulation like a flight simulator, the simulation may be inaccurate with respect to the pilot using the simulation. For example, the avatar of the flight simulator may be set up to lose consciousness at eight G's. However, the pilot using the simulator may only be able to tolerate seven G's before losing consciousness. As a result, the pilot would be able to perform maneuvers in the simulator, such as combat maneuvering, that he would be unable to perform in an actual, real-world scenario.

Another result of limitations of the avatars not being tied to the physical activity level and/or skill level of the user of the virtual-reality setting is that the virtual-reality setting provides no incentive for the virtual-reality user to improve his real-world activity level. In many instances, video games encourage players (i.e., users of virtual reality settings) to be sedentary for long periods of time because attributes and/or capabilities of the avatar used by the player increase with playing time. For example, an avatar in a role-playing game may be able to perform more powerful spells, be able to absorb more damage, or the like as the player progresses through the game. Thus, the player is incentivized to play the game as much as possible, possibly at the expense of real-world physical activity.

SUMMARY

According to one embodiment, a computer-implemented method for applying a real-world physical activity attribute of a virtual reality (VR) user to an avatar in a VR setting is provided. The method includes receiving data related to at least one real-world physical activity metric of the VR user. The method also includes modifying at least one virtual activity capability of the avatar in the VR setting based on the received data.

According to one embodiment, a system includes an input operable to receive data related to at least one real-world physical activity metric of a user of the VR setting. The system also includes a data structure configured to store a computer program that implements a virtual reality (VR) setting. The data structure is also configured to store the received data. The system also includes a computer processor in communication with the data structure and configured to modify at least one virtual activity capability of the avatar in the VR setting based on the received data.

According to one embodiment, a computer program product for applying a real-world physical activity attribute of a virtual reality (VR) user to an avatar in a VR setting is provided. The computer program product includes a computer-readable storage medium having computer-readable program code embodied therewith. The computer-readable program code is executable by one or more computer processors to receive data related to at least one real-world physical activity metric of the VR user. The computer-readable program code is also executable to modify at least one virtual activity capability of the avatar in the VR setting based on the received data.

BRIEF DESCRIPTION OF THE SEVERAL VIEWS OF THE DRAWINGS

FIG. 6A illustrates a table according to at least one embodiment for translating a real-world activity metric to a real-world skill level and translating the real-world skill level to an attribute level for an avatar in a virtual reality setting;

FIG. 6B illustrates a table according to at least one embodiment for translating a real-world activity metric to a real-world skill level and translating the real-world skill level to an attribute level for an avatar in a virtual reality setting; and FIG. 7 illustrates a table according to at least one embodiment for translating a real-world activity metric to a real-world skill level and translating the real-world skill level to an attribute level for an avatar in a virtual reality setting.

DETAILED DESCRIPTION

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

In the various embodiments described herein, attributes and/or capabilities of an avatar in a virtual-reality setting are at least partly affected by a real world physical activity metric of the user controlling the avatar. As a result, the virtual-reality setting can provide a more accurate simulation of an environment for the particular user and/or can provide an incentive for the user to engage in physical real-world activity.

Figure 1:
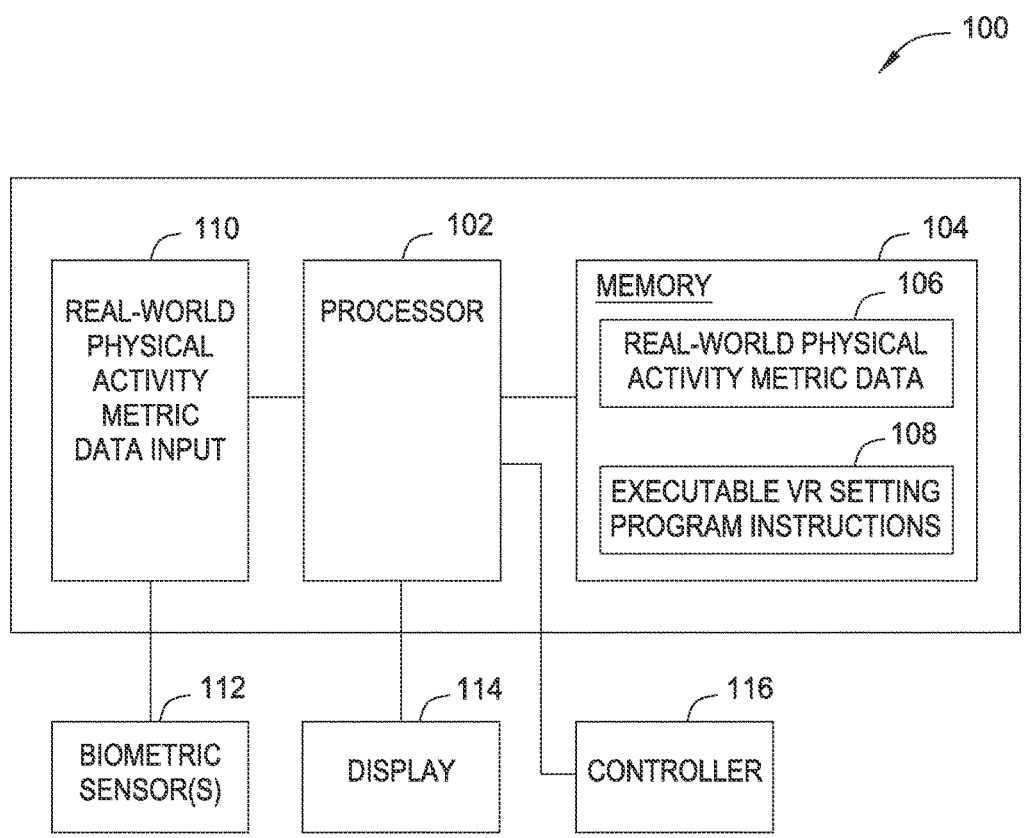
FIG. 1 is a block diagram of a system for implementing a virtual reality setting with an avatar having at least one attribute based on a real-world activity level of a user of the avatar.

FIG. 1 illustrates a system 100 according to at least one embodiment for operating a virtual-reality setting in which an avatar in the virtual-reality setting includes at least one attribute and/or capability that is tied to a real-world activity level of a user of the virtual-reality setting. The system 100 includes a computer processor 102 and computer memory 104 in communication with the processor 102. The computer memory 104 includes one or more data structures that store real-world physical activity metric data 106 of the user. The memory also stores executable virtual-reality setting program instructions 108. The system 100 also includes a real-world physical activity metric data input 110 that can receive real-world physical activity metrics related to the user. The real-world physical activity metric data input 110 could be a USB port, a wireless or wired Ethernet connection, a Bluetooth data connection, or the like. The real-world physical activity metric data input 110 can be connected to one or more biometric sensors 112 that detect activity metrics of the user. Examples of biometric sensors 112 include, but are not limited to, pedometers, heart rate monitors, smart watches with biometric sensors, step tracking devices (e.g., Fitbit® activity monitors), smart phones, and the like. The biometric sensors 112 can provide real-world physical activity metric data to the real-world physical activity metric data input 110. Examples of real-world physical activity metric data include, but are not limited to, resting heart rate, active heart rate, average daily number of steps taken, daily number of stairs climbed, running speed, maximum running distance, running elevation change, maximum walking distance, and walking speed.

The system 100 can be attached to and/or in communication with a computer display 114 that can display an image of the virtual-reality setting and/or an image that illustrates attributes and/or capabilities of the avatar in the virtual-reality setting. The system 100 can also be connected to a controller 116 (e.g., a keyboard, a mouse, a gamepad, or the like) that the user of the virtual-reality setting can use to provide commands to the avatar in the virtual-reality setting.

Figure 2:
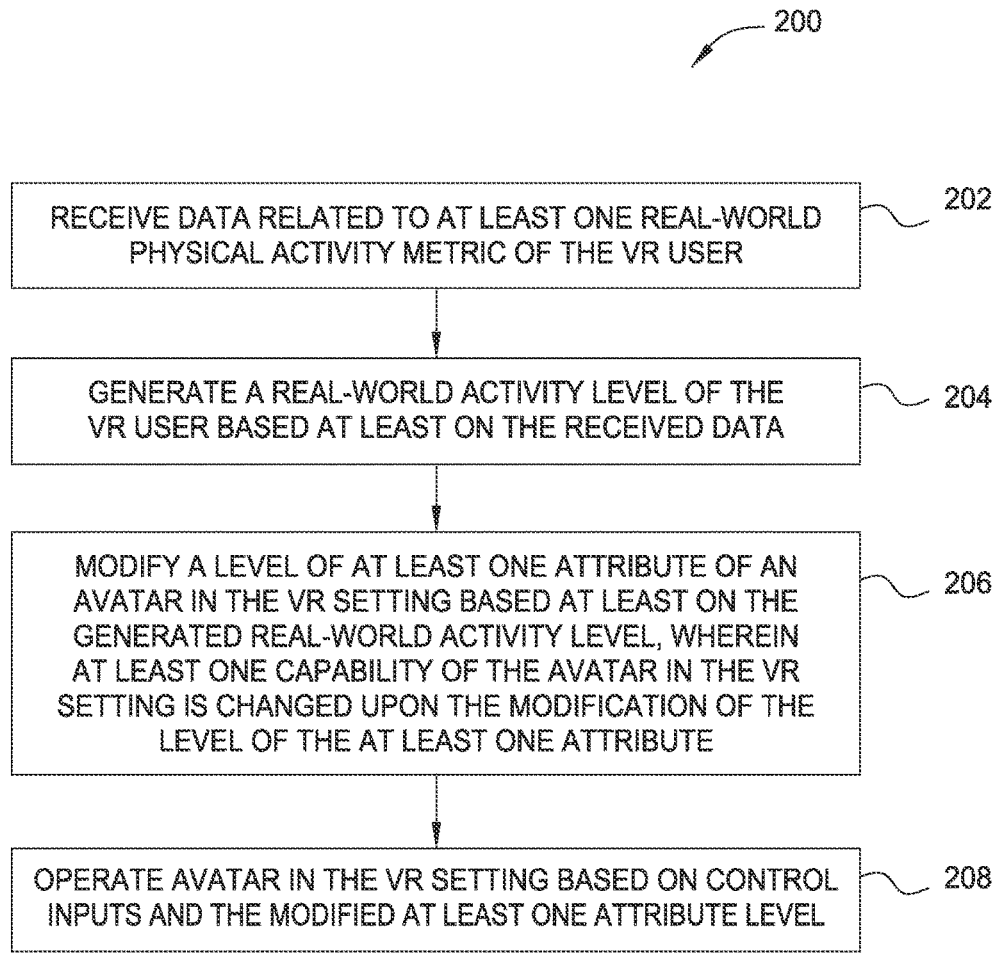
FIG. 2 is a flow chart illustrating a method for modifying at least one attribute for an avatar in a virtual reality setting based on a real-world activity level of a user of the avatar.

FIG. 2 illustrates a method 200 according to at least one embodiment for tying attributes and/or capabilities of an avatar in a virtual-reality setting to the real-world physical activity metrics of a virtual-reality user. In block 202, data related to at least one real-world physical activity metric of the virtual-reality user is received. For example, the at least one real-world physical activity metrics could be the average daily number of steps taken by the user in the real world. In block 204, a real-world activity level of the virtual-reality user based at least on the received data is generated. For example, a first real-world activity level could be associated with a first range of number of steps taken by the user, a second real-world activity level could be associated with a second range of number of steps taken, and so on. In various embodiments, the real-world activity could be based on more than one real-world activity metric. For example, a real-world activity level could be based on a combination of the number of steps taken and amount of time the user walked. In block 206, the level of at least one attribute of an avatar in the virtual-reality setting is modified based on the generated real-world activity level. For example, an attribute for the avatar could be a stamina level, and the stamina level of the avatar could vary on a scale from one to five where one is low stamina and five is high stamina. In an instance in which a user is assigned to the first real-world activity level, the avatar could be modified to have a stamina level of one. In an instance in which the user is assigned to the second real-world activity level, the avatar could be modified to have a stamina level of two. An avatar with a stamina level of one may only be able to run, fight, etc. for a short time. An avatar with a stamina level of five may be able to run, fight, etc. for a very long time. Avatars with stamina levels between one and five may be able to run, fight, etc. for amounts of time therebetween. Thus, at least one capability of the avatar is changed based on the setting of the stamina attribute.

As the real-world activity metric of the user of the virtual-reality setting changes (block 202), the real-world activity level (block 204) can also change. As a result, the at least one attribute of the avatar in the virtual-reality setting can be modified to reflect the changed real-world activity level. Continuing the example above, suppose that the user increases his average daily number of steps taken from the first range to the second range. The real-world activity level of the user would correspondingly change from the first real-world activity level to the second real-world activity level. As a result, the stamina level of the avatar in the virtual reality setting would be modified from a stamina level of one to a stamina level of two, enabling the avatar to run, fight, etc. for a longer amount of time.

In block 208, the avatar is operated in the virtual-reality setting based on control inputs from the user and the modified at least one attribute level. Continuing the example above, the user may press a particular button on a controller (controller 116 in FIG. 1) to command the avatar to swing a sword during a fight. Based on a stamina level of one, the avatar may be able to swing the sword ten times in one minute. If the user presses the particular button more than ten times in a minute, the avatar may not swing the sword in response to the button pushes in excess often. Alternatively, the avatar may swing the sword in response to the button pushes in excess often, but any sword hits may result in less damage or may be easier to avoid, for example. Continuing the example, based on a stamina level of two, the avatar may be able to swing the sword fifteen times in one minute. After the user has improved his real-world physical activity metric such that his average daily number of steps is in the second range (and the real-world activity level has increased to level two and the stamina level of the avatar has been modified to stamina level two), the user can press the particular button fifteen times in a minute with the avatar responding.

Figure 3A:
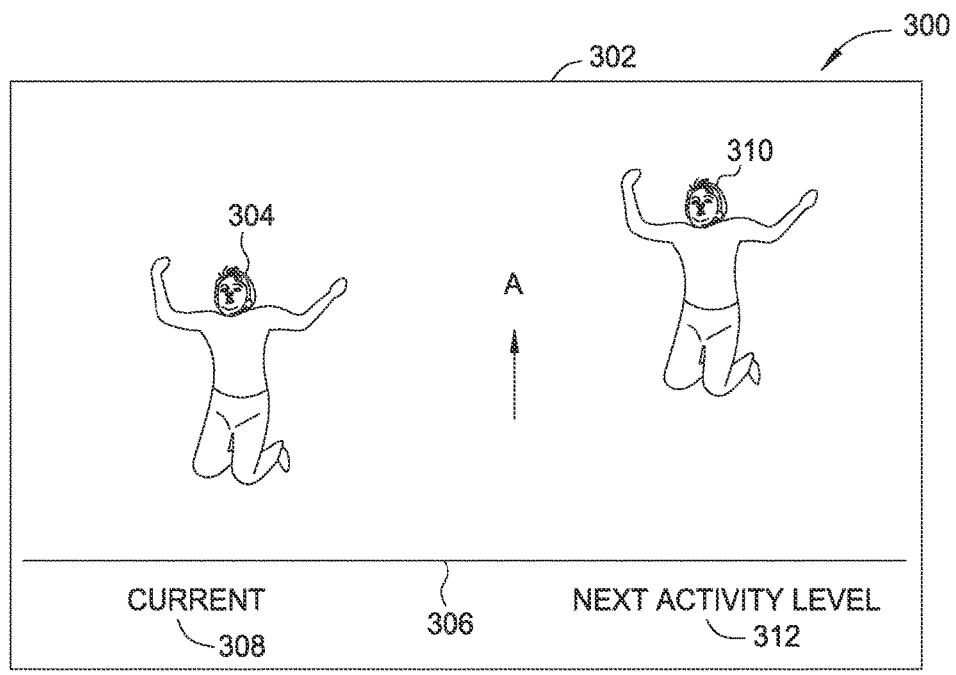
FIG. 3A shows a computer display screen view illustrating an effect of achieving a next attribute level for an avatar for a virtual reality setting according to at least one embodiment.

In various embodiments, a system according to at least one embodiment can display to the virtual reality user the effects of a modification to an attribute and/or a capability of the avatar. FIG. 3A illustrates an exemplary display 300 of the effects of a modification to a jumping attribute of an avatar. The display 300 is provided on a computer display 302 (e.g., the display 114 referenced in FIG. 1) and shows a first avatar 304 jumping from the ground 306 in the direction of arrow A. The display 300 includes a label 308 which states "current," indicating that the jump height of the first avatar 304 above the ground 306 indicates the current jumping attribute and/or capability of the avatar 304. The display 300 also shows a second avatar 310 jumping from the ground 306 in the direction of arrow A by a higher amount than the avatar 304. The display 300 includes a label 312 which states "next activity level," indicating that the jump height of the second avatar 310 above the ground 306 indicates a jumping attribute and/or capability when the avatar 310 reaches the next level for the attribute and/or capability. The display 300 illustrated in FIG. 3A may be provided to the user during a pause, break, intermission, or the like in the virtual-reality setting. For example, the display 300 could be illustrated to a user playing a first-person shooter game while the next level is loading, when the game starts, when the user pauses the game, when the user enters a menu structure of the game or the like.

Figure 3B:
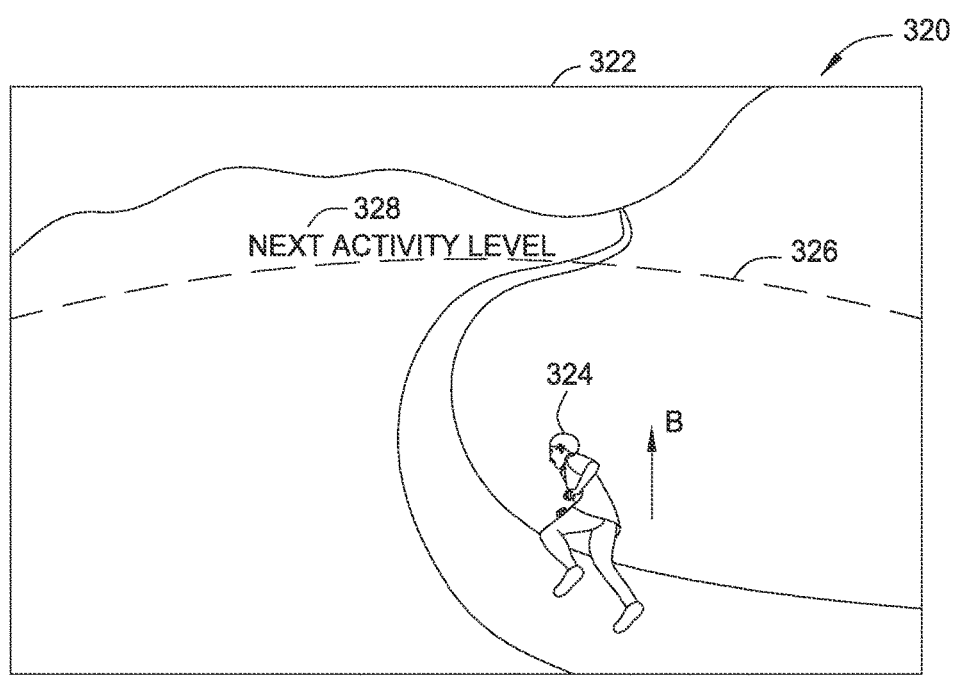
FIG. 3B shows a computer display screen view illustrating an effect of achieving a next attribute level for an avatar for a virtual reality setting according to at least one embodiment.

FIG. 3B illustrates an exemplary display 320 of the effects of a modification to a running endurance attributes of an avatar while the user is controlling the avatar in the virtual-reality setting. The display 320 is provided on a computer display 322 (e.g., the display 114 referenced in FIG. 1) and shows an avatar 324 running in the direction of arrow B. For illustration purposes, in some games, an avatar can move indefinitely at a first speed (e.g., a walking speed) and can move at a second speed (e.g., a running speed) for short bursts. The amount of time or distance that the avatar can move at the second speed could be tied to the real-world activity level of the user. FIG. 3B illustrates the moment when a short burst of running (i.e., the second speed) for the avatar 324 ends such that the avatar 324 starts walking again (i.e., the first speed). The display 320 momentarily includes a line 326 superimposed on the virtual reality setting ahead of the avatar 324 to indicate how far the avatar 324 would have been able to run if the avatar 324 had attained the next running endurance attribute level. The display 320 also includes a label that states "next activity level" to indicate the meaning for the line 326 appearing in the virtual-reality setting.

Figure 3C:
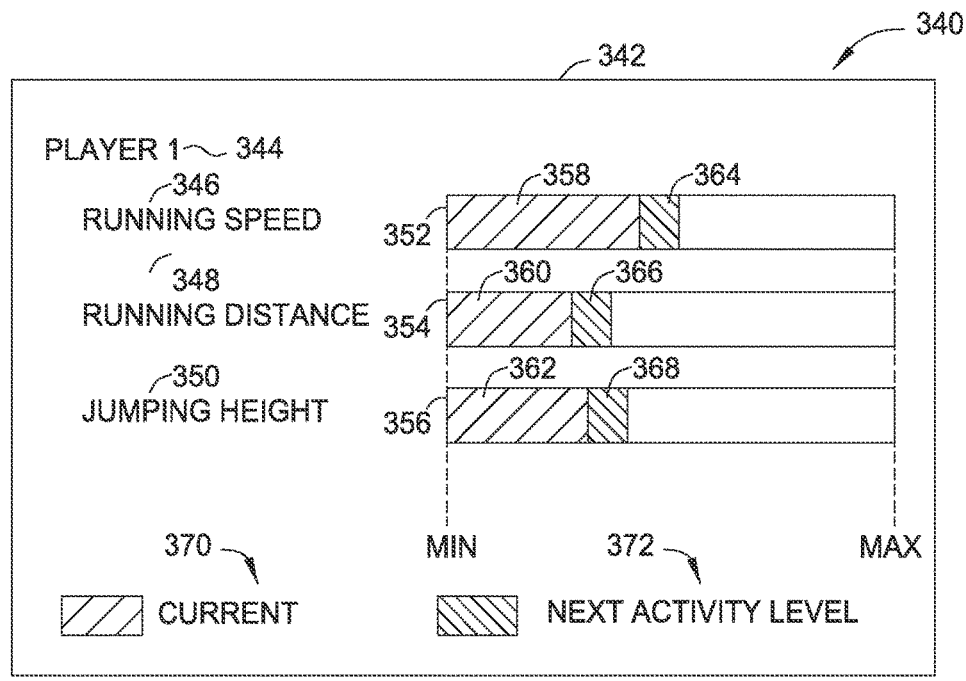
FIG. 3C shows a computer display screen view illustrating an effect of achieving a next attribute level for an avatar for a virtual reality setting according to at least one embodiment.

FIG. 3C illustrates an exemplary display 340 of the effects of a modification to movement attributes of an avatar in a virtual-reality setting. The display 320 is provided on a computer display 342 (e.g., the display 114 referenced in FIG. 1) and shows a pause screen, a load screen, a menu screen, or the like in which various attributes for the avatar are displayed in a bar graph style format. The display 340 includes an avatar identifier 344 and three movement attributes for the avatar: running speed 346, running distance 348, and jumping height 350. The display 340 includes a legend that includes a first shading identifier 370 for the current attribute level and a second shading identifier 372 for the next attribute level. The running speed 346 movement attribute is aligned with a bar graph 352 that illustrates a current running speed attribute for the avatar (indicated by a portion 358 of the bar graph 352 shaded using the first shading identifier 370) and a future running speed for the avatar based on the next activity level (indicated by a portion 364 of the bar graph 352 shaded using the second shading identifier 372) relative to a minimum and a maximum running speed. The running distance 348 movement attribute is aligned with a bar graph 354 that illustrates a current running distance attribute for the avatar (indicated by a portion 360 of the bar graph 354 shaded using the first shading identifier 370) and a future running distance for the avatar based on the next activity level (indicated by a portion 366 of the bar graph 354 shaded using the second shading identifier 372) relative to a minimum and a maximum running speed. The jumping height 350 movement attribute is aligned with a bar graph 356 that illustrates a current jumping height attribute for the avatar (indicated by a portion 362 of the bar graph 356 shaded using the first shading identifier 370) and a future jumping height for the avatar based on the next activity level (indicated by a portion 368 of the bar graph 356 shaded using the second shading identifier 372) relative to a minimum and a maximum running speed.

In various games, particularly first-person shooting games, the game will often provide a short cut scene after a player has failed. For example, in some first person shooter games, a player is often shown a short scene after his avatar is killed to show how the avatar died. In various instances, it may have been possible for the avatar to avoid dying (or otherwise failing) if the avatar had achieved a next attribute level. For example, at a higher attribute level, the avatar may have been able to outrun an enemy, inflict more damage in a fight, or the like. In various embodiments, such a cut scene could include a visual example of how the avatar may have survived at a higher attribute level. For example, the cut scene could first show the avatar being caught by an enemy and then show the avatar outrunning the enemy. The cut scene could include legends or other messages to encourage the player to achieve the next attribute level by improving his real-world activity level.

Figure 4A:
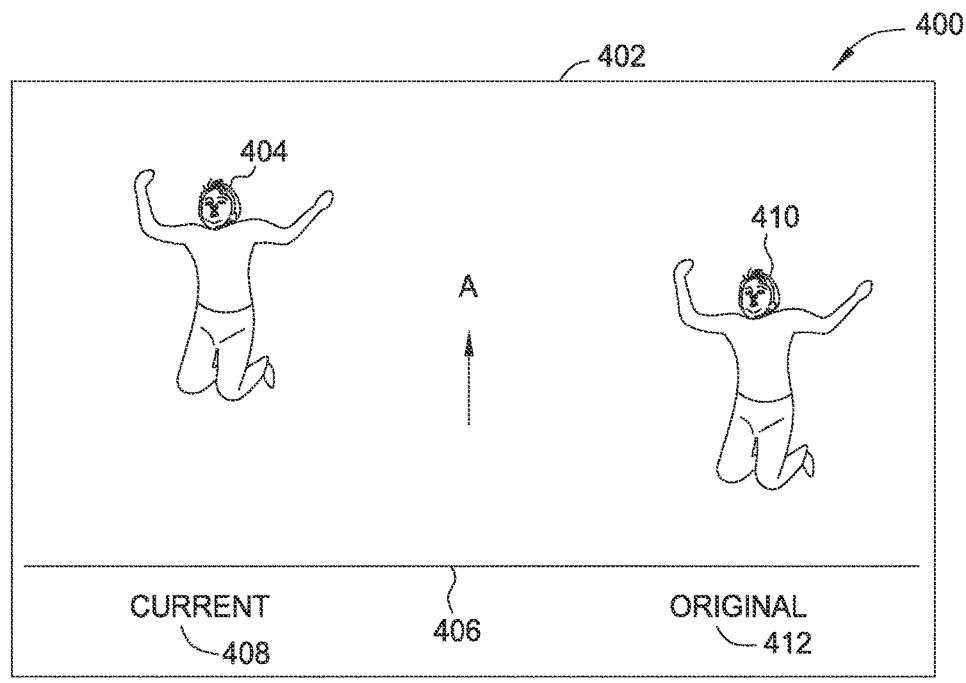
FIG. 4A shows a computer display screen view illustrating an effect of having achieved a particular attribute level for an avatar for a virtual reality setting relative to a starting attribute level.

Referring to FIG. 4A, a system according to various embodiments can display to a user of the virtual-reality setting the attribute improvements the avatar has received over time as the physical activity metrics of the user have improved over time. For example, the system could display to the user improvements from when the user controlled the avatar in the virtual-reality setting for the first time, from a date picked by the user, or for a predetermined time interval (e.g., the last ninety days). FIG. 4A illustrates a jumping height attribute improvement display 400 on a computer display screen 402 (e.g., the display 114 shown in FIG. 1) and shows a first avatar 404 jumping off the ground 406 in the direction of arrow A. The display 400 includes a legend 408, stating "current," to indicate that this is the current jumping height attribute for the avatar 404. The display 400 also shows a second avatar 410 jumping off the ground 406 (in the direction of arrow A) to a lesser degree than the first avatar 404. The display 400 includes a legend 412, stating "original," to indicate that this is the original jumping height attribute for the avatar 404. The display 400 in FIG. 4A can provide encouragement and motivation for the user to continue improving his physical activity metrics such that his avatar can continue to improve within the virtual reality setting.

Figures 4B, 5:
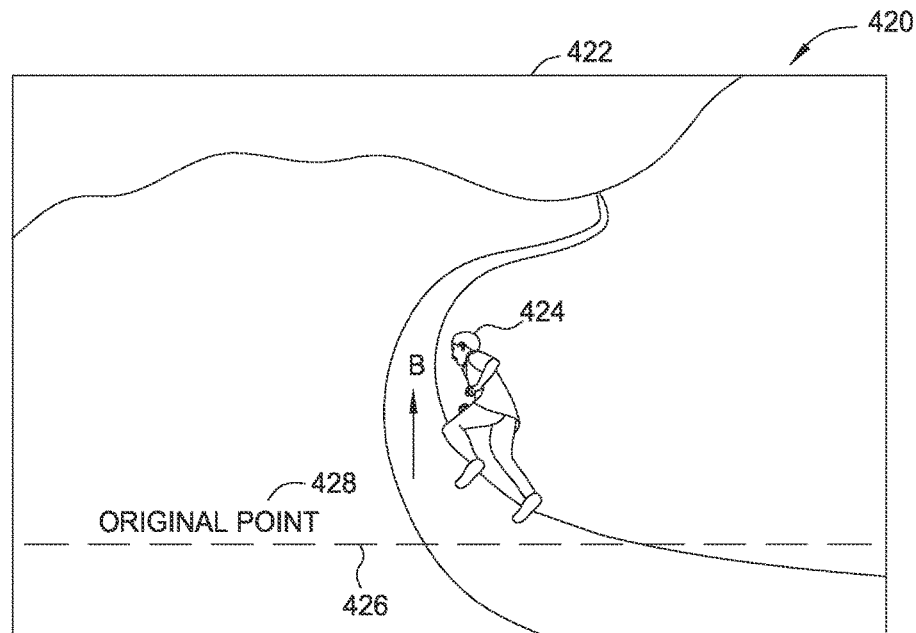
FIG. 4B shows a computer display screen view illustrating an effect of having achieved a particular attribute level for an avatar for a virtual reality setting relative to a starting attribute level.
FIG. 5 illustrates a table according to at least one embodiment for translating a real-world activity metric to a real-world activity level and translating the real-world activity level to an attribute level for an avatar in a virtual reality setting.

FIG. 4B illustrates a running distance attribute improvement display 420 on a computer display screen 422 (e.g., the display 114 shown in FIG. 1) and shows an avatar 424 running in the direction of arrow B. As discussed above, in certain virtual reality settings, an avatar can walk indefinitely but can only run in bursts. In the exemplary display 420 shown in FIG. 4B, the avatar 424 has increased a running distance attribute above and original level. As the avatar 424 runs past the original level, a line 426 is superimposed on the image of the virtual-reality setting to show where the avatar 424 would have stopped running at the original attribute level. A legend 428, stating "original point," can also be superimposed on the display of the virtual-reality setting to indicate the meaning of the superimposed line 426.

In various embodiments, a system could use lookup tables or the like to provide and/or determine correspondences between real-world activity levels of virtual-reality users and attributes and/or capabilities of avatars in the virtual-reality setting. FIG. 5 illustrates an exemplary lookup table 500 that provides correspondences between a user's real world running distance and a running duration attribute for an avatar. A first column 502 of the exemplary lookup table 500 categorizes real-world running distances for the user into running distances of less than one mile in row 508, running distances between one mile and three miles in row 510, and running distances of more than three miles in row 512. A second column 504 of the exemplary lookup table 500 provides correspondences between the real world running distances in column 502 and a real-world activity level. For example, real world running distances of less than one mile (in column 502 and row 508) correspond to a real-world activity level of "one" (in column 504 and row 508). As another example, real world running distances of between one mile and three miles (in column 502 and row 510) correspond to a real-world activity level of "two" (in column 504 and row 510). As another example, real world running distances of more than three miles (in column 502 and row 512) corresponds to a real-world activity level of "three" (in column 504 and row 512). A third column 506 of the exemplary lookup table 500 provides correspondences between the real-world activity levels (in column 504) and a running duration attribute for the avatar. For example, the activity level of "one" (in column 504 and row 508) corresponds to a running duration attribute of twenty seconds for the avatar (in column 506 and row 508), meaning the avatar can run for twenty seconds before returning to a walking speed. As another example, the activity level of "two" (in column 504 and row 510) corresponds to a running duration attribute of thirty seconds for the avatar (in column 506 and row 510), meaning the avatar can run for thirty seconds before returning to a walking speed. As another example, the activity level of "three" (in column 504 and row 512) corresponds to a running duration attribute of forty five seconds for the avatar (in column 506 and row 512), meaning the avatar can run for forty five seconds before returning to a walking speed. In various embodiments, the lookup table 500 can include more or fewer categories of real-world running distances, real-world activity levels, and avatar running duration attributes. Similar lookup tables could be provided for other real-world physical activity metrics, such as running speed, running elevation change, jumping height, and the like.

Referring to FIGS. 6A and 6B, a system according to at least one embodiment could use the data related to real-world physical activity metrics for a user of the virtual-reality setting to infer real-world skill levels of the user. The system could then provide the avatar in the virtual-reality setting with a related skill level. FIG. 6A illustrates an exemplary lookup table 600 that a system could use to provide an avatar with a golf swing skill level based on the number of golf swings that a virtual-reality setting user takes. A smart watch, wrist worn fitness tracker, or the like could monitor movement of the user's arm and record any movements similar to a golf swing (e.g., a vertical swinging motion) as a golf swing. The user's recorded golf swings can be counted to determine how many golf swings the user made in a given week, for example. A first column 602 of the exemplary table 600 categorizes the number of real-world golf swings that the user could take in a week into less than one hundred golf swings per week (in row 608), between one hundred and three hundred golf swings per week (in row 610), and more than three hundred golf swings per week (in row 612). A second column 604 of the exemplary lookup table 600 provides correspondences between the number of golf swings per week and a real-world activity skill level of the user. For example, real-world golf swings of less than one hundred golf swings per week (in column 602 and row 608) corresponds to a real-world activity skill level of "one" (in column 604 and row 608). As another example, real-world golf swings of between one hundred and three hundred golf swings per week (in column 602 and row 610) corresponds to a real-world activity skill level of "two" (in column 604 and row 610). As another example, real-world golf swings of more than three hundred golf swings per week (in column 602 and row 612) corresponds to a real-world activity skill level of "three" (in column 604 and row 612). A third column 606 of the exemplary lookup table 600 provides correspondences between the real-world activity skill levels (in column 604) and a golf shot accuracy attribute for the avatar. For example, the activity skill level of "one" (in column 604 and row 608) corresponds to a golf shot accuracy attribute of 60% (in column 606 and row 608), meaning that 60% of the golf balls "struck" by the avatar in the virtual reality setting will go where the user intended. A randomly-selected 40% of the golf ball "struck" by the avatar in the virtual setting will go in an errant direction (e.g., will be sliced, hooked, or shanked). As another example, the activity skill level of "two" (in column 604 and row 610) corresponds to a golf shot accuracy attribute of 85% (in column 606 and row 610), meaning that 85% of the golf balls "struck" by the avatar in the virtual reality setting will go where the user intended. As another example, the activity skill level of "three" (in column 604 and row 612) corresponds to a golf shot accuracy attribute of 98% (in column 606 and row 612), meaning that 98% of the golf balls "struck" by the avatar in the virtual reality setting will go where the user intended. In various embodiments, the lookup table 600 can include more or fewer categories of real-world number of golf swings per week, real-world activity skill levels, and avatar golf shot accuracy attributes.

In various aspects, the activity tracker tracking the number of real-world golf swings taken by a user could capture swing data to determine whether a particular swing is a "good" swing or a bad "swing." For example, captured swing data could be analyzed to determine if the arc of the player's swing would result in a straight shot, a slice, or a hook. As another example, the captured swing data could include impact information that identifies whether the real-world golf swing resulted in a "sweet spot" of a club impacting the ball. Such swing data could be used to determine a real-world activity skill level and/or an attribute for an avatar. For example, if 60% of a player's real-world swings resulted in a straight shot, then 60% of the golf strokes taken by the avatar could go straight. Similarly, if 30% of the player's real-world swings result in a slice, then 30% of the golf strokes taken by the avatar could result in a slice. Also, if 10% of the player's real-world swings result in a hook, then 10% of the golf strokes taken by the avatar could result in a hook. As another example, if 70% of the player's real-world swings impact the ball with the sweet spot, then 70% of the golf strokes taken by the avatar could hit with the sweet spot of a virtual golf club. The remaining 30% of the golf strokes taken by the avatar would not hit the sweet spot and may not travel as far and/or may be mishit (e.g., shanked).

FIG. 6B illustrates another exemplary lookup table 600 that the system could use to provide an avatar with a golf shot accuracy attribute based on a reported real-world golf handicap of the user. For example, the system could include an entry field or the like (e.g., displayed on the display 114 shown in FIG. 1) in which the user could enter his current golf handicap. As another example, the system could include a data connection that can connect to a remote computer system and retrieve from that remote computer system the user's handicap score. A first column 632 of the exemplary table 630 categorizes the real world golf handicap of the user into a handicap of more than twenty strokes (in row 638), between ten and twenty strokes (in row 640), and less than ten strokes (in row 642). A second column 634 of the exemplary lookup table 630 provides correspondences between the categorized handicap score and a real-world activity skill level of the user. For example, real-world golf handicaps of greater than twenty (in column 632 and row 638) corresponds to a real-world activity skill level of "one" (in column 634 and row 638). As another example, real-world golf handicaps between ten and twenty (in column 632 and row 640) correspond to a real-world activity skill level of "two" (in column 634 and row 640). As another example, real-world golf handicaps of less than ten (in column 632 and row 642) correspond to a real-world activity skill level of "three" (in column 634 and row 642). A third column 636 of the exemplary lookup table 630 provides correspondences between the real-world activity skill levels (in column 634) and a golf shot accuracy attribute for the avatar. For example, the activity skill level of "one" (in column 634 and row 638) corresponds to a golf shot accuracy attribute of 70% (in column 636 and row 638), meaning that 70% of the golf balls "struck" by the avatar in the virtual reality setting will go where the user intended. As another example, the activity skill level of "two" (in column 634 and row 640) corresponds to a golf shot accuracy attribute of 90% (in column 636 and row 640), meaning that 90% of the golf balls "struck" by the avatar in the virtual reality setting will go where the user intended. As another example, the activity skill level of "three" (in column 634 and row 642) corresponds to a golf shot accuracy attribute of 97% (in column 636 and row 642), meaning that 97% of the golf balls "struck" by the avatar in the virtual reality setting will go where the user intended. In various embodiments, the lookup table 630 can include more or fewer categories of real-world number of golf swings per week, real-world activity skill levels, and avatar golf shot accuracy attributes.

In various embodiments, the golf shot accuracy attribute of the avatar described above with reference to FIGS. 6A and 6B could be determined based on both the number of real-world golf swings per week by the user of the virtual-reality setting and the user's golf handicap, when both are available. For example, a system may interpolate between the exemplary table 600 and the exemplary table 630 to provide a golf shot accuracy attribute for the avatar based on the user's real-world number of golf swings and real-world golf handicap. For example, suppose the user's real-world golf handicap is between ten and twenty (column 632 and row 640 in the exemplary table 630) and he takes more than 300 golf swings per week (column 602 and row 612 in the exemplary table 600). The system could provide an average between the 90% golf shot accuracy attribute associated with the handicap and the 98% golf shot accuracy attribute associated with the number of golf swings per week to provide the avatar with a golf shot accuracy attribute of a 94%, for example.

In various aspects, a real-world skill level of the user of an avatar in a virtual setting may be based on time spent doing a real-world activity. For example, a person may become a more skilled driver by spending more time driving a vehicle. Referring now to FIG. 7, an exemplary table 700 provides correspondences between an amount of time that a user of an avatar in a virtual-reality setting spends driving in the real world per week and an endurance level of the avatar in an auto racing virtual reality setting. A first column 702 of the exemplary table 700 categorizes the real-world number of hours driving per week into less than ten hours per week (in row 708), between ten and twenty hours per week (in row 710), and more than twenty hours per week (in row 712). A second column 704 of the exemplary lookup table 700 provides correspondences between the categorized number of hours driving per week and a real-world activity skill level of the user. For example, driving less than ten hours per week (in column 702 and row 708) corresponds to a real-world activity skill level of "one" (in column 704 and row 708). As another example, driving between ten hours and twenty hours per week (in column 702 and row 710) corresponds to a real-world activity skill level of "two" (in column 704 and row 710). As another example, driving more than twenty hours per week (in column 702 and row 712) corresponds to a real-world activity skill level of "three" (in column 704 and row 712). A third column 706 of the exemplary lookup table 700 provides correspondences between the real-world skill levels (in column 704) and a driving endurance attribute for the avatar. For example, the activity skill level of "one" (in column 704 and row 708) corresponds to a driving endurance attribute for the avatar of thirty minutes (in column 706 and row 708), meaning that the avatar can drive for thirty minutes before becoming fatigued. As another example, the activity skill level of "two" (in column 704 and row 710) corresponds to a driving endurance attribute for the avatar of sixty minutes (in column 706 and row 710), meaning that the avatar can drive for sixty minutes before becoming fatigued. As another example, the activity skill level of "three" (in column 704 and row 712) corresponds to a driving endurance attribute for the avatar of ninety minutes (in column 706 and row 712), meaning that the avatar can drive for ninety minutes before becoming fatigued.

In various embodiments, physiological data related to the user can be applied to attributes of an avatar in a virtual reality setting. For example, flight simulators are used for pilots to practice flight operations. Military pilots sometimes use simulators to practice combat missions in which they perform high G maneuvers. During real-world high G maneuvers, blood in the body is forced away from the pilot's brain and toward the feet. Such blood flow can cause a pilot to become impaired and eventually lose consciousness as the G forces increase. Different pilots are able to tolerate different G forces before becoming impaired. In many instances, pilots may go through testing and training to determine their G force limits and to improve their G force limits. A pilot's tested tolerance to G forces could be input into an avatar in a flight simulator. Then, if the pilot applies control inputs in the simulator that would result in G forces beyond the pilot's tolerance level in the real world, a display screen view of the virtual reality setting in the simulator could dim. By tying the simulator performance to the real-world capabilities of the pilot, the pilot is forced to control the simulated aircraft in a manner that is realistic for his personal limitations. For example, a default simulator avatar for a fighter aircraft may be able to tolerate ten G's (acceleration equal to ten times the force of gravity). However a particular pilot may only be able to tolerate eight G's. If the pilot operated the simulator using the default avatar, he would be able to perform simulated maneuvers that he would not be physically capable of performing in the real-world (i.e., performing a 10 G maneuver). By customizing an avatar to only tolerate 8 G's, the pilot would not be able to perform a 10 G maneuver in the flight simulator and the simulation would be more realistic for him.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications to modify attributes of an avatar or related data available in the cloud. For example, converting real-world activity metric(s) of a user to a real-world activity level(s) and attribute levels for an avatar could execute on a computing system in the cloud and the attribute levels for an avatar could be loaded into a virtual reality setting. In such a case, the attribute level application could determine and/or calculate the attribute levels for the avatar and store the attribute levels at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A computer-implemented method to apply a physical activity attribute of a virtual reality (VR) user to an avatar in a VR setting, the computer-implemented method comprising:

operating the avatar during a first virtual interaction of the VR user within the VR setting, including causing the avatar to perform a first avatar ability of the avatar;

subsequent to the first avatar ability of the avatar being performed, reflecting the physical activity metric of the VR user in the avatar by operation of one or more computer processors and by, upon determining that a first physical activity metric of the VR user satisfies a first predefined threshold, increasing the first avatar ability of the avatar in the VR setting, wherein the increased avatar ability is selected from an increased maximum avatar power, an increased maximum avatar speed, an increased maximum avatar endurance, an increased maximum avatar stamina, an increased avatar accuracy, an increased maximum avatar swordsmanship stamina, and an increased avatar golfing accuracy; and subsequent to increasing the first avatar ability of the avatar, operating the avatar during a second virtual interaction of the VR user within the VR setting, including causing the avatar to perform the increased avatar ability, wherein an indication of the increased avatar ability is generated and output, thereby providing an incentive for the VR user to improve the physical activity metric of the VR user to further increase the first avatar ability of the avatar in the VR setting.

2. The computer-implemented method of claim 1, wherein the avatar is operated in the VR setting based at least on control inputs received from the VR user and based further on the increased avatar ability of the avatar.

3. The computer-implemented method of claim 1, further comprising: outputting a display illustrating a next measure by which the avatar ability of the avatar can be increased based at least on a next physical activity metric increase of the VR user.

4. The computer-implemented method of claim 1, further comprising: outputting a display illustrating the first avatar ability of the avatar as being associated with the physical activity metric of the VR user.

5. The computer-implemented method of claim 1, wherein the physical activity metric of the VR user comprises at least one of: resting heart rate, active heart rate, average daily number of steps taken, daily number of stairs climbed, running speed, maximum running distance, running elevation change, maximum walking distance, and walking speed.

6. The computer-implemented method of claim 1, wherein the avatar is operated in the VR setting based at least on control inputs received from the VR user and based further on the increased avatar ability of the avatar, wherein the operation further comprises:

outputting a first display illustrating a next measure by which the avatar ability of the avatar can be increased based at least on a next physical activity metric increase of the VR user;

outputting a second display illustrating the first avatar ability of the avatar as being associated with the physical activity metric of the VR user.

7. The computer-implemented method of claim 6, wherein the physical activity metric of the VR user comprises: resting heart rate, active heart rate, average daily number of steps taken, daily number of stairs climbed, running speed, maximum running distance, running elevation change, maximum walking distance, and walking speed, wherein the physical activity metric of the VR user is detected via at least one biometric sensor.

8. The computer-implemented method of claim 7, further comprising, in a first instance: designating a physical activity level for the VR user based on the physical activity metric of the VR user, wherein the physical activity level is selected from selecting one of a plurality of discrete physical activity levels, each of which corresponds to a respective, distinct range of the first avatar ability of the avatar, wherein the first avatar ability of the avatar in the VR setting is increased based on the designated physical activity level.

9. The computer-implemented method of claim 8, wherein in a second instance, the physical activity level of the VR user is designated by executing a mathematical function using the physical activity metric as an input.

10. The computer-implemented method of claim 9, wherein the executed mathematical function outputs the physical activity level based on the physical activity metric.

11. The computer-implemented method of claim 10, wherein the physical activity metric comprises an experience metric for a real-world physical activity.

12. A system to apply a physical activity attribute of a virtual reality (VR) user to an avatar in a VR setting, the system comprising:
  one or more computer processors;
  a memory containing a program that, when executed by operation of the one or more computer processors, performs an operation comprising:
  operating the avatar during a first virtual interaction of the VR user within the VR setting, including causing the avatar to perform a first avatar ability of the avatar;
  subsequent to the first avatar ability of the avatar being performed, reflecting the physical activity metric of the VR user in the avatar by, upon determining that a first physical activity metric of a user of the VR setting satisfies a first predefined threshold, increasing the first avatar ability of the avatar in the VR setting, wherein the increased avatar ability is selected from an increased maximum avatar power, an increased maximum avatar speed, an increased maximum avatar endurance, an increased maximum avatar stamina, an increased avatar accuracy, an increased maximum avatar swordsmanship stamina, and an increased avatar golfing accuracy; and
  subsequent to increasing the first avatar ability of the avatar, operating the avatar during a second virtual interaction of the VR user within the VR setting, including causing the avatar to perform the increased avatar ability, wherein an indication of the increased avatar ability is generated and output, thereby providing an incentive for the VR user to improve the physical activity metric of the VR user to further increase the first avatar ability of the avatar in the VR setting.

13. The system of claim 12, further comprising at least one biometric sensor operable to detect the first physical activity metric of the VR user.

14. The system of claim 12, wherein the avatar is operated in the VR setting based at least on control inputs received from the VR user and based further on the increased avatar ability of the avatar.

15. The system of claim 12, wherein the operation further comprises: outputting an image illustrating a next measure by which the avatar ability of the avatar can be increased based at least on a next physical activity metric increase of the VR user.

16. The system of claim 12, wherein the operation further comprises: outputting an image illustrating the first avatar ability of the avatar as being associated with the physical activity metric of the VR user.

17. A computer program product to apply a physical activity attribute of a virtual reality (VR) user to an avatar in a VR setting, the computer program product comprising:
  A non-transitory computer-readable storage medium having computer-readable program code embodied therewith, the computer-readable program code executable by one or more computer processors to perform an operation comprising:
  operating the avatar during a first virtual interaction of the VR user within the VR setting, including causing the avatar to perform a first avatar ability of the avatar;
  subsequent to the first avatar ability of the avatar being performed, reflecting the physical activity metric of the VR user in the avatar by, upon determining that a first physical activity metric of the VR user satisfies a first predefined threshold, increasing the first avatar ability of the avatar in the VR setting, wherein the increased avatar ability is selected from an increased maximum avatar power, an increased maximum avatar speed, an increased maximum avatar endurance, an increased maximum avatar stamina, an increased avatar accuracy, an increased maximum avatar swordsmanship stamina, and an increased avatar golfing accuracy; and
  subsequent to increasing the first avatar ability of the avatar, operating the avatar during a second virtual interaction of the VR user within the VR setting, including causing the avatar to perform the increased avatar ability, wherein an indication of the increased avatar ability is generated and output, thereby providing an incentive for the VR user to improve the physical activity metric of the VR user to further increase the first avatar ability of the avatar in the VR setting.

18. The computer program product of claim 17, wherein the avatar is operated in the VR setting based at least on control inputs received from the VR user and based further on the increased avatar ability of the avatar.

19. The computer program product of claim 17, wherein the operation further comprises: outputting a display illustrating a next measure by which the avatar ability of the avatar can be increased based at least on a next physical activity metric increase of the VR user.

20. The computer program product of claim 17, wherein the operation further comprises: outputting a display illustrating the first avatar ability of the avatar as being associated with the physical activity metric of the VR user.

* * * * *